UNITED STATES PATENT OFFICE.

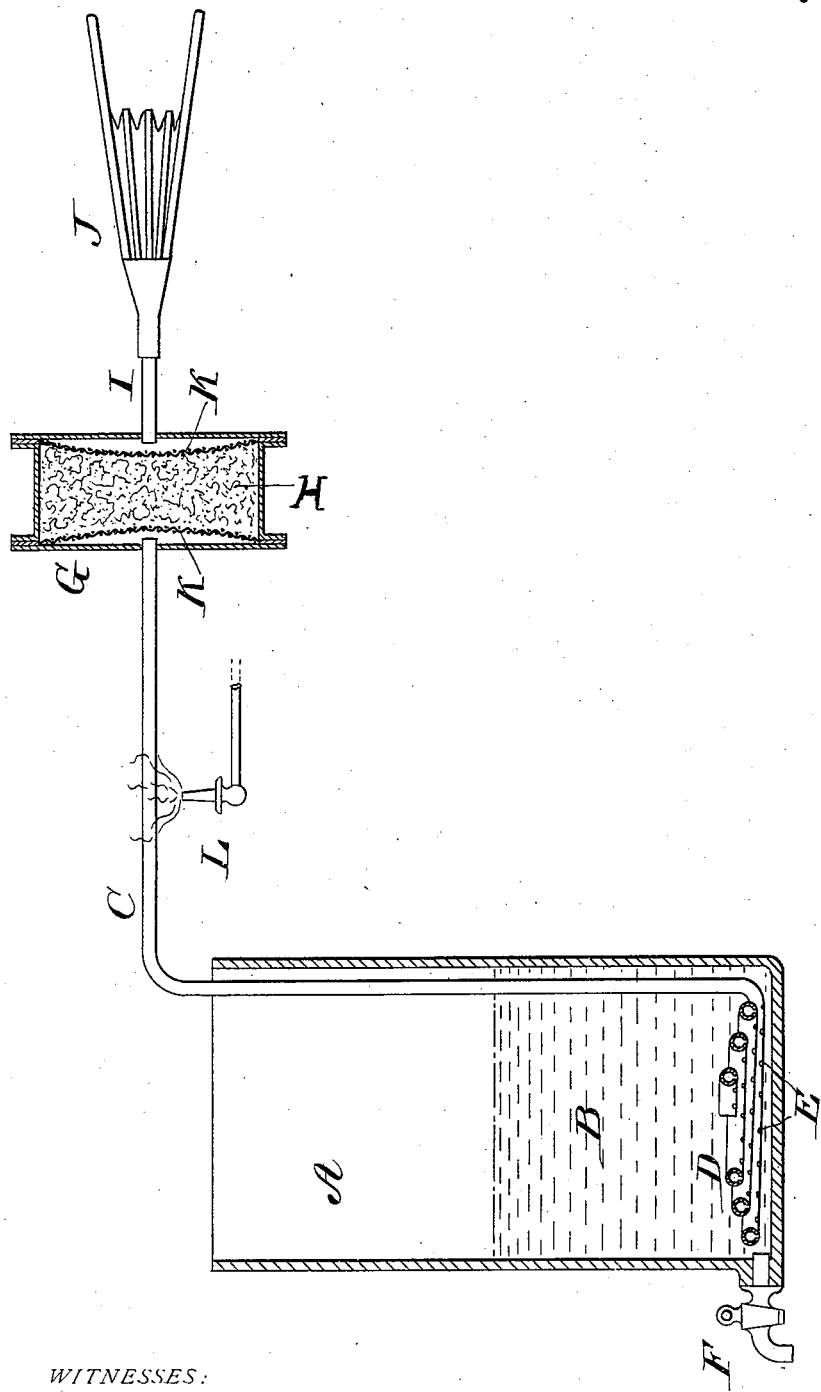

WALTER COLE, OF NEW YORK, N. Y., ASSIGNOR TO WILLIAM H. VAN STEENBERGH, OF SAME PLACE.

PROCESS OF MANUFACTURING BUTTER.

SPECIFICATION forming part of Letters Patent No. 564,325, dated July 21, 1896.

Application filed August 24, 1895. Serial No. 560,337. (No specimens.)

*To all whom it may concern:*

Be it known that I, WALTER COLE, a subject of the Queen of Great Britain, and a resident of New York city, in the county of New York and State of New York, have invented a certain new and useful Improved Process for the Manufacture of Butter, of which the following is a specification.

This invention relates to a novel process for separating the butter from cream by employing certain chemical or non-churning agencies as contradistinguished from the mechanical agencies or processes heretofore used.

The process consists in first subjecting the cream to natural lactic fermentation sufficient to coagulate the albuminous sacs of the butter-globules, and, second, producing a rapid alcoholic fermentation in the non-fatty solids of the cream to destroy the viscidity of the fluid and effect the separation of the butter-globules from the remaining elements of the cream. By this process I am enabled to effect the aggregation of the butter-globules without rupturing their sacs and without churning the fluid, and I thus avoid the contamination of the butter-globules by the odorous, impure, or fermented elements of the cream. The quality of the butter is thereby rendered uniformly excellent, independent of the skill of the operator, the feed of the cows, or climatic changes in temperature. Oxygenation of the casein, sugar, and other non-fatty solids in the cream is necessary to transform the lactic to an alcoholic fermentation, and a much higher temperature is required to produce such alcoholic fermentation than to produce or maintain the lactic. The continuance of lactic fermentation under any of the ordinary conditions to which cream is subjected in the dairy produces merely a putrefactive fermentation, as a mere increase of temperature, as, for instance, that produced by warmer weather, does not suffice to induce the alcoholic ferment without agitation of the cream with air to oxidize the fermentable elements.

All the standard writers upon dairy-work dictate a temperature below 60° Fahrenheit as absolutely necessary to the separation of butter from cream, as the fat, if the cream is below 45°, is too hard to agglomerate readily; if much above 55° the butter becomes oily and soon becomes rancid, and if the cream is above 60° it becomes "yeasty," as it is called, with the result that the butter will not "come" or agglomerate and the cream is spoiled.

All churning processes, whether pneumatic or mechanical, have been practiced with the cream at a temperature not above 60°, for the reasons just named, with which temperature it is impossible to introduce alcoholic fermentation in the cream by agitation with air.

The mere agitation of the cream with air, as in the pneumatic churns heretofore used, does not therefore produce the least alcoholic fermentation, owing to the temperatures invariably employed in connection with such agitation.

I have discovered that agitation with air at a temperature from 15° to 20° higher than that ever before used in the making of butter produces very remarkable changes in the constitution of the cream, and operates automatically to separate the butter-globules from the other elements without rupturing such globules.

Butter cannot be made by my process without raising the temperature of the cream to 75°, 80°, or even 85° Fahrenheit, a degree unheard of before in the dairy for butter-making.

When the cream is agitated with air, the alcoholic fermentation is induced, and it becomes at first like a mass of yeast, expanding to three times its original bulk. The so-called "animal odors" pass off during such expansion, the yeasty conditions subside, and the cream resumes its former bulk; but the original viscidity of the cream is found to be entirely destroyed, so that the globules of butter rise rapidly and the top of the casein or residue of the ferment sinks to the bottom. A little water is thrown upon the butter to separate the small amount of casein that may be entangled in it, and the operation of butter-making is completed and is ordinarily effected in a period of thirty minutes. What takes place within the cream during such treatment will be understood by considering that cream contains a considerable portion of free albumen, together with that forming the envelops of the butter-globules, and being of a very viscid nature such albumen adheres to the fat and becomes agglomerated with it in the formation of the butter, together with a portion of the casein, sugar, and mineral matter, so as to form in some cases as much as twenty-two per cent. of the finished article. Furthermore, the alcoholic fermentation alters the nature of the material upon which it acts, disintegrating the material, disengaging carbonic acid, and setting up new combinations, and the effect of the fermentation upon the albumen and casein of the cream is to entirely destroy their viscidity, and the butter-globules are enabled to separate therefrom by their mere specific gravity, the albumen forming the envelops or sacs of the globules having been preserved during this proceeding by their previous coagulation under the lactic fermentation. It will therefore be understood that the alcoholic fermentation is employed to produce physical and chemical changes in the cream, which produces the separation of the butter-globules without churning the fluid and without rupturing the envelops of the globules, which would expose them to contamination from the fermentable elements.

In practice the mixing with air and the heating of the cream are most readily performed by heating the air and blowing it gently through the cream from the bottom of the mass, the current of air being introduced at such a low velocity as to produce no perceptible movement in the mass, except at the top, where it at first produces small bubbles. When the alcoholic fermentation is set up, it extends through the mass with great rapidity, and ebullition is produced by the disengagement of the carbonic-acid gas, which operates, as in the use of yeast, to expand the whole mass and diffuse the ferment through every portion of the fluid.

The whole operation of making the butter consists substantially in disintegrating the non-fatty elements of the cream, so as to destroy their viscidity and separate them from the butter-globules by the mere action of gravity. The alcoholic fermentation is very rapid under the conditions employed, and the whole process thus occupies not more than thirty minutes.

It will be understood that the mere mingling of air with the cream at a temperature from 75° to 85° Fahrenheit will not produce alcoholic fermentation in cream, but that the cream must be first subjected to the natural lactic fermentation by previous exposure to a necessary temperature.

By all the processes heretofore used butter can be made from sweet cream, and the sweeter the cream the better is the butter. By my invention sour cream is required to practice the process, but the butter-globules are separated from the other elements without the rupture of their envelops, and the sweetness of the butter is not therefore affected by the sourness of the cream. No care needs to be taken in making butter by my process to keep the cream cool to prevent lactic fermentation, and the great saving in the labor and expense during warm weather is thus effected.

The vessel in which the cream is fermented is not a churn, nor is the fluid agitated by the air in any such manner as to churn the cream or to separate the fat by its mechanical effect. Violent mechanical or pneumatic agitation of the cream if introduced into my process would prevent the making of butter, as the mechanical action would rupture the butter-globules and mix the elements which are in a state of ferment with the butter-fat, and thus produce merely a mass of yeast.

Any suitable means may be used to set up the alcoholic ferment, the annexed drawing illustrating an apparatus adapted to produce such effect by injecting a gentle current of suitably-heated air into the bottom of the cream.

Referring to the said drawing, A represents a vessel which I term the "converter," of glass or other suitable material, for containing the cream B to be treated, which converter may be left open at the top, as shown in the drawing, throughout the operation.

C represents an air-pipe, coiled at D and having minute perforations E underneath the coils for distributing fine bubbles of air emitted under moderate pressure into the bottom of the converter A with as little agitation to the cream as possible.

F is a discharge-cock for removing the by-products and water after the butter has been produced.

G is an air-filter consisting of a suitable air-tight vessel containing dry cotton H, the pipe C connecting with one end of the filter and the pipe I connecting with the other end of the filter to supply air by means of a bellows J or other suitable source. The cotton may be supported between two diaphragms K K, of wire-netting, so as to allow access and even distribution of the air through all parts of the cotton, so as to pass the required quantity. The amount of air consumed during the operation being small, but a moderate supply is needed.

L represents a gas or other burner for heating the air before it enters the converter A.

The operation is as follows: The converter A is charged about one-half full with the cream to be treated. The burner L is ignited, and the bellows J is set in motion, so that the purified air shall rise from the coil D slowly in fine bubbles in such manner as to strictly avoid churning. The burner L is so regulated that the air shall enter the converter A at a temperature sufficient to produce rapid alcoholic fermentation of the cream. A temperature of between 70° and 90° Fahrenheit is suitable. A temperature of 80° is preferable.

It is essential to my improved process that the cream be first subjected to lactic fermentation, which coagulates or fixes the albuminous envelops of the butter-globules and protects the butter from the subsequent chemical changes in the other constituents of the cream during separation by the artificial alcoholic fermentation. The elements of decay are contained entirely in the casein and not in the fatty solids, and I have discovered that the two constituents may be separated by a non-churning aerification at such temperature as indicated, producing butter which is perfectly sweet and free from rancidity irrespective of the advanced stage of previous lactic fermentation of the cream. During this artificial and non-agitating method of separation the cream first becomes like a mass of yeast, say three times its original bulk, then all the so-called "animal odors" that may be present from strong foods, such as turnips, ensilage, mangolds, and lucerne, or even weeds, will pass off, the decomposition being complete. Then the yeasty condition subsides and the cream reduces to its former bulk and the viscidity of the cream is entirely destroyed. The globules of butter being thus freed immediately rise to the top in the converter A, and the casein or residue of the ferment being of greater specific gravity settles to the bottom. A little water is thrown onto the butter to carry down what little casein may have become entangled in it, and the operation is complete, the whole process occupying not more than from eight to thirty minutes.

I am aware that the churning of cream into butter has been attempted heretofore by means of air forced into the cream, so as to violently agitate the same; but such attempts have invariably been made under low temperatures of from 45° to 55° Fahrenheit, alcoholic fermentation being purposely avoided, and have proved failures, the air being used as a mere mechanical substitute for dashers or beaters, but failing to throw the cream violently from end to end of the churn with sufficient force to rupture the albuminous sacs of the butter and cause the fatty solids to agglomerate.

Under mechanical methods, if the cream is kept until it goes "bad," or, in other words, has begun to ferment, it is impossible by violent agitation to make an edible butter from it for the reason that the mechanical action breaks up the globules and mixes with the fat those constituents of the cream which are in a state of ferment. This ferment acts upon the volatile oil, which is the most important constituent of the butter, and converts it into butyric acid, thus producing rancidity.

To make good butter by the mechanical method, sweet cream is necessary, and a degree of skill is required in the art which few attain even after years of practice, whereas by my herein-described non-churning and purely chemical process of aerification at fermenting temperature, so-called "bad" cream may be used in an advanced state of lactic ferment and produce sweet butter without skill, training, or personal ability on the part of the operator. A warm climatic temperature is therefore immaterial, and the expense of keeping the cream in a refrigerated condition is avoided. The butter made by my newly-discovered process will keep perfectly good and sweet for many months without the aid of salt, refrigeration, or antiseptics of any kind, owing to the elimination of all the fermentable substances.

Having now described the nature of my invention and in what manner it is to be performed, I wish it to be understood that I do not confine myself to the construction and arrangement of apparatus such as I have described and illustrated for carrying out my invention, since it is obvious that any suitable apparatus may be used to practice the invention.

What I claim is—

1. The process of manufacturing butter, which consists in first subjecting the cream to natural lactic fermentation sufficient to coagulate the albuminous sacs of the butter-globules, second, producing a rapid alcoholic fermentation in the non-fatty solids of the cream to destroy the viscidity of the cream, and to effect the separation of the butter-globules from the remaining elements of the cream, substantially as herein set forth.

2. The process of manufacturing butter, which consists in first subjecting the cream to natural lactic fermentation sufficient to coagulate the albuminous sacs of the butter-globules, second, suitably heating the material and subjecting it to a non-churning aerification sufficient to produce rapid alcoholic fermentation of the non-fatty solids without breaking the sacs of the butter-globules, and thereby producing a separation of the other elements from the butter-globules and facilitating the collection of the globules by specific gravity at the top of the material, substantially as described.

Signed at New York city, in the county of New York and State of New York, this 6th day of August, A. D. 1895.

WALTER COLE.

Witnesses:
H. F. PARKER,
K. M. TUCKER.